US005508704A

United States Patent [19]

Hann

[11] Patent Number: 5,508,704

[45] Date of Patent: Apr. 16, 1996

[54] METHOD AND APPARATUS FOR MODULATING A DOPPLER RADAR SIGNAL

[76] Inventor: Lenn R. Hann, 1643 Kemper Dr., Naperville, Ill. 60563

[21] Appl. No.: 260,960

[22] Filed: Jun. 16, 1994

[51] Int. Cl.$^6$ .......................... G01S 15/18

[52] U.S. Cl. .......................... 342/6; 342/7

[58] Field of Search .......................... 342/5, 6, 7

[56] References Cited

U.S. PATENT DOCUMENTS

| | | | |
|---|---|---|---|
| 927,499 | 7/1909 | Davis | 342/8 X |
| 1,384,014 | 7/1921 | Fessenden | 342/6 |
| 2,432,984 | 12/1947 | Budenbom | 342/6 |
| 2,443,643 | 6/1948 | Schelleng | 342/6 X |
| 2,452,822 | 11/1948 | Wolf | 342/7 |
| 2,463,517 | 3/1949 | Chromak | 342/8 |
| 2,472,212 | 6/1949 | Hudspeth | 342/188 |
| 2,503,509 | 4/1950 | Rader | 359/526 |
| 2,697,828 | 12/1954 | Heintz | 342/7 |
| 3,010,103 | 11/1961 | Hopper | 342/9 |
| 3,010,104 | 11/1961 | Powell | 342/9 |
| 3,787,856 | 1/1974 | Pyrah | 342/6 |
| 4,370,654 | 1/1983 | Krutsch | 342/6 |
| 4,517,569 | 5/1985 | Gerharz | 342/8 X |
| 4,785,301 | 11/1988 | Schafer et al. | 342/7 |
| 5,202,689 | 4/1993 | Bussard et al. | 342/10 |
| 5,274,379 | 12/1993 | Carbonneau et al. | 342/45 |

*Primary Examiner*—John B. Sotomayor

*Attorney, Agent, or Firm*—Charles F. Meroni, Jr.

[57] ABSTRACT

There is disclosed herein a system for reflecting electromagnetic radiation emanating from a doppler-based radar source toward the source whereby at least a portion of the difference between the emanating and reflected signal is continuously varied between preselected limits by causing the reflector to oscillate along the beam axis. The reflector is moved between approximately 0.001 and 0.250 inches and at a frequency mix ranging between about 2,000 Hz and 15,000 Hz. The reflector is mounted to a reciprocating system which is provided to drive the reflector.

15 Claims, 1 Drawing Sheet

METHOD AND APPARATUS FOR MODULATING A DOPPLER RADAR SIGNAL

BACKGROUND OF THE INVENTION

This invention relates to electromagnetic radiation devices in general and more specifically to a reflector system for use with doppler-based radar.

Doppler-based radar is used primarily by public law enforcement agencies for the purpose of gathering data, usually velocity, about an automobile where visual observation is inexact and impractical. The underlying concept behind doppler-based radar is that movement of an object can be detected by radiating the object and measuring the frequency of the reflected waves, calculating the difference between emanating and reflected wave frequency, determining the frequency shift and then correlating frequency shift with velocity. Devices which utilize radar and corner-cube reflectors are shown in the prior art and patents such as U.S. Pat. Nos. 2,432,984; 2,452,822; 2,697,828; 3,308,464; and 4,370,654. Corner-cube reflectors specifically and radar technology in general are well-described in the book, "Radar Principles for the Non-Specialist, Second Edition" by John C. Toomay, ISBN 0-442-20719-0.

Sometimes it is desirable to preclude this gathering of information, and thus it is desirable to inhibit or interfere with such use of this radar. Moreover, the return signal should not be actively generated. Finally, the presence of the radar may be detected by other devices in order to signal the presence of radar in order to either manually or automatically initiate operation of the system of this invention.

Thus, it is an object of this invention to provide a reflective device which inhibits or interferes with doppler-based radar speed measurement equipment.

Another object of the invention is that the apparatus should be passive in the sense that it emits no microwave energy.

Yet another object of the invention is that the device should be a reflector and not create any new signals.

These and other objects of this invention will become apparent from the following disclosure and appended claims.

SUMMARY OF THE INVENTION

There is provided by this invention a passive system which does not generate a new radar signal but which continuously varies and reflects the incoming signal and acts to reflect the incoming wave to the source so as to inhibit accurate information gathering concerning the object. The operation of a doppler-based radar detector is based upon a reflection of electromagnetic waves from an object so that the difference between emanating waves and reflected waves (i.e., the frequency shift) can be detected, correlated and displayed. It is generally assumed that the frequency shift will occur within certain limits (i.e., the verification window). Thus, variation in frequency shift, particularly beyond the limits of the verification window, can result in unreliable determinations of speed and thus may not result in any display of data concerning the object. Similarly, causing the apparatus to oscillate at multiple frequencies of similar amplitude will also inhibit the display of data concerning the object. Thus in such a system the object may become, in effect, transparent to the radar.

In order to be effective the frequency shift or modulation of the reflected signal should continuously vary beyond predetermined limits with respect to the source so that the source receives different and continuously varying shifts in signals from the reflector. One way of producing this is by axially oscillating, through the use of a continuously varying signal, a highly reflective member such as a corner cube reflector or Luneberg lens or other highly efficient reflector of microwave energy relative to the incoming signal sufficiently fast to cause a continuous variance in frequency shift which is added to the reflected doppler return signal. The mechanism for reflector movement must account for numerous factors such as speed, acceleration, stopping, starting, mass, etc.

The inventor believes that doppler-based radar is presently used extensively in civilian applications and thus this invention is believed to be principally applicable in civilian uses.

To achieve the foregoing and other objectives, and in accordance with the purposes of the present invention, a system for use in reflecting electromagnetic radiation emanating from a source toward the source is provided, wherein there is a frequency difference between emanating radiation and reflected radiation and at least a portion of said difference is caused to continuously vary.

In accordance with another feature, a doppler-based radar system is provided. The system includes generating of an electromagnetic signal, directing the signal toward a target, receiving a signal reflected by the target, and detecting frequency differences between the generated and the received signal; and for reflecting signals to the source and for continuously modulating the reflected signal frequency so that the difference between the generated and the reflected signal continuously varies and contains added frequency content.

In accordance with a method of the present invention, a method for continuously varying the frequency difference between emanating and reflected radar signals is provided. The method comprising the steps of: generating and directing a first radar signal of a first frequency toward an object; receiving the generated signal and reflecting a second signal from the target toward the source; continuously modulating the reflected signal; and detecting the reflected signal and determining the frequency differences between the generated and reflected signal wherein the differences continuously vary.

Still other objects and advantages of the present invention will become readily apparent to those skilled in the art from the following detailed description and drawings.

DESCRIPTION OF THE PREFERRED EMBODIMENT

Figure 1:
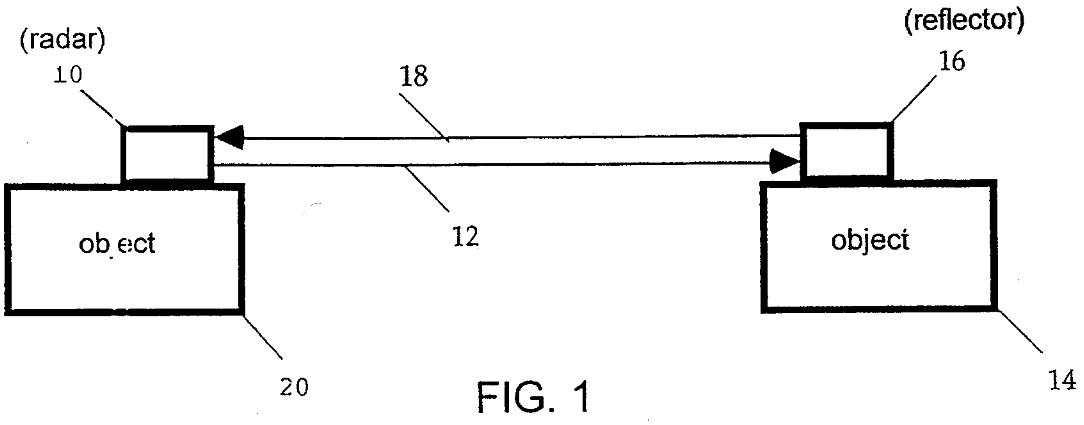
FIG. 1 is a schematic diagram of system operation.

Referring first to FIG. 1, there is shown a wave propagating source such as doppler-based radar 10 which beams or emanates electromagnetic radiation 12 at an object 14. The radiation may have the following characteristics: wavelength 2.85 cm, frequency 10.525 GHz, and power 500 mw. However, the radiation can vary within the following ranges:

wavelength 2.85 to 0.83 cm; frequency 10.00 to 36.000 GHz; power 75 to 750 mw. In this application it is assumed that the source automobile or object 20 is essentially stationary and the object is moving, generally toward or away from the source. However, there are situations in which both the object and the source are movable. But the relative oscillation of the reflector and source is the important factor.

The object can be or include a radar reflecting structure of an area between 4 and 80 or more square inches such as 16 that is mounted for movement, specifically oscillation, relative to the source 10. The reflector 16 returns electromagnetic radiation directly to the source. However, due to the oscillation of the reflector, the returning or reflected radiation is not identical to the incoming or emanating radiation in that the frequency of the returning radiation has been altered or modulated by the speed of the object and the oscillation of the reflector. In general, it is the difference between the frequency content of the emanating electromagnetic radiation 12 and the reflected electromagnetic radiation 18 that is important. The continuous oscillation of the reflector continuously varies the return frequency content and such variation can cause invalid readings.

In the preferred embodiment, an oscillating-style corner cube reflector is believed to be optimum, as such a reflector directs the reflected beam directly back to the source essentially along the incoming beam axis although a Luneberg lens or other reflector can be used.

Figure 2:
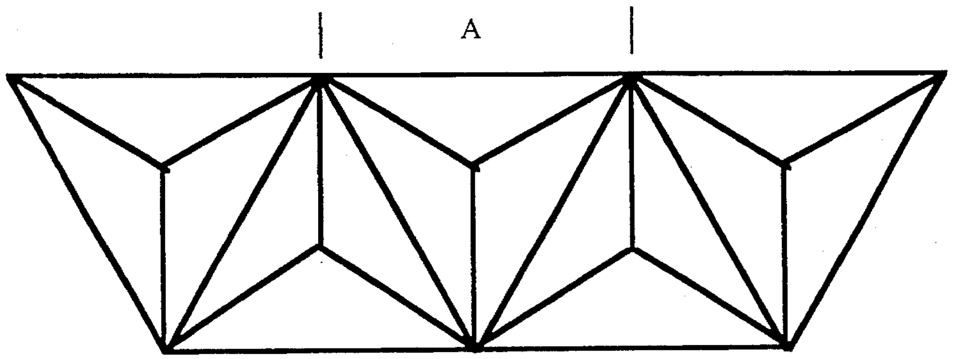
FIG. 2 is a plan view of the reflector showing an array of five corner-cube reflectors.

In other words, the reflected beam is directed axially back to the source along the axis of the incident beam. It has been found that the corner cube aperture size (A in FIG. 2) as measured across the flats of the cube is at least 0.75 in. In general, the cube size is related to the radar frequency and vehicle frontal area. More specifically, the total size of the reflector must be large enough to dominate the radar cross section (RCS) of the target. In general, it is important that the reflector oscillates and the frequency of the oscillation is related to the environment in which the reflector is being used.

Important movement factors appear to be the speed of oscillation of the reflector which is relative to the displacement or stroke of the reflector and frequency of movement. In general, greater reflector area and greater reflector amplitude for a given frequency mix contribute to an increased ability to dominate the RCS of an object.

In some situations it is desirable to select a combination of stroke and frequency on the basis of the frequency, while in other situations selection of the combination may be based on stroke considerations. Thus various combinations of reflective capability can be chosen. In other words depending upon the results sought, different operating parameters can be selected.

Figure 3:
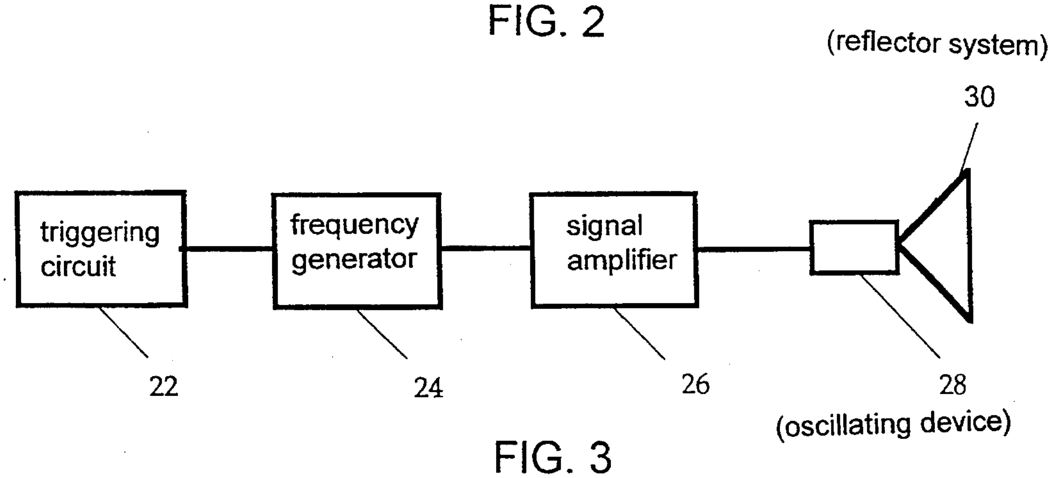
FIG. 3 shows an apparatus for oscillating the reflector.

A mechanism for oscillating the reflector is shown in FIG. 3. There the corner-cube reflector system 30 of about twelve square inches of frontal area is affixed to a mechanical linear oscillating device or reciprocating system 28 such as an audio speaker, solid state linear oscillator or solenoid generally for movement. The mechanical oscillator is driven by a signal or mix of signals originating in an electronic frequency generator 24 which is fed into a signal amplifier 26. Preferably, the reflector is moved between approximately 0.001 and 0.250 inches and at a frequency mix ranging between about 2,000 Hz and 15,000 Hz. A triggering circuit 22 may be used to initiate operation of the device upon sensing the presence of doppler radar.

All of the apparatus components are readily accessible through a consumer electronics supply catalog. The corner-cube reflector array is a custom-designed part and must be fabricated.

Although the invention has been described with respect to preferred embodiments, it is not to be so limited as changes and modifications can be made which are within the full intended scope of the invention as defined by the appended claims.

I claim as my invention:

1. A system for use in reflecting electromagnetic radiation emanating from a source toward the source, the system comprising: means for producing a frequency difference between emanating radiation and reflected radiation and at least a portion of said difference is caused to continuously vary, the frequency difference being modulated with varied frequency differences associated with said source, an array of electromagnetic radiation retro-reflectors operatively connected to the means for producing a frequency difference that are constructed to oscillate toward and away from said source.

2. A system as in claim 1, which further includes means for mounting said retro-reflectors and means for moving said mounting means which includes a support on which the retro-reflectors are mounted and a reciprocating system for causing the retro-reflectors to oscillate.

3. A system as in claim 2, wherein the reciprocating system includes a solenoid-like mechanism.

4. A system as in claim 2, wherein the reciprocating system includes a mechanical linear oscillator.

5. A system as in claim 2, wherein the reciprocating system includes a solid state linear oscillator.

6. A system as in claim 2, wherein said movement means are constructed and arranged to move the retro-reflectors a distance of between 0.001 and 0.250 inches at a frequency between about 2,000 and 15,000 Hz.

7. A system as in claim 6, wherein said retro-reflectors vary in area from 4 or greater square inches.

8. A reflector system for use with doppler-based radar emanating from a source and for reflecting radar toward its source, which includes means defining a corner cube reflector means for supporting and moving said reflector a distance of between about 0.001 and 0.250 inches at a frequency continuously varying between about 2,000 and 15,000 Hz, which movement means includes a reciprocably movable frame to which said reflector is mounted and for supporting said reflector and means for reciprocably moving said reflector.

9. A doppler-based radar system which includes:

means for generating an electromagnetic signal, directing the signal toward a target, receiving a signal reflected by the target, and detecting frequency differences between the generated and the received signal; and means associated with the target for reflecting signals to the source and for continuously modulating the reflected signal frequency so that the frequency difference between the generated and the reflected signal continuously varies and contains added frequency content.

10. A method for continuously varying the frequency difference between emanating and reflected radar signals comprising the steps of:

generating and directing a first radar signal of a first frequency toward an object;

receiving the generated signal and reflecting a second signal from the target toward the source;

continuously modulating the reflected signal; and detecting the reflected signal and determining the frequency differences between the generated and reflected signal wherein the differences continuously vary.

11. An electromechanical apparatus for modulating a reflected return of a Doppler-based electromagnetic radiation transmission, the apparatus comprising:

(a) an electromagnetic retro-reflector having a size adapted to dominate a radar cross section of a target;

(b) electromechanical means for axially oscillating the retro-reflector toward and away from an electromagnetic radiation transmission source;

(c) signal means for generating signals; and (d) means operatively connected to the electromechanical means for amplifying signals produced by the signal means.

12. The apparatus of claim 11, wherein the electromagnetic means produces movement of the retro-reflector a distance of between 0.001 and 0.250 inches at a frequency between about 2,000 and 15,000 Hz.

13. The apparatus of claim 12, wherein said retro-reflectors vary in area from 4 or greater square inches.

14. The apparatus of claim 13, further comprising triggering means electrically connected to said signal means for initiating operation of the apparatus.

15. An electromechanical apparatus for modulating a reflected return of a Doppler-based electromagnetic radiation transmission, the apparatus comprising:

(a) an electromagnetic retro-reflector;

(b) signal means for generating continuously varying signals; and (c) electromechanical means connected to the electromagnetic retro-reflector and responsive to the signal means for axially oscillating the retro-reflector toward and away from an electromagnetic radiation transmission source.

* * * * *